United States Patent [19]

Herrmeyer

[11] Patent Number: 5,083,833
[45] Date of Patent: Jan. 28, 1992

[54] VARIABLE SIZE DOOR ASSEMBLY

[76] Inventor: Dennis Herrmeyer, 2216 Lincoln St., No. 20, Cedar Falls, Iowa 50613

[21] Appl. No.: 643,120

[22] Filed: Jan. 18, 1991

[51] Int. Cl.[5] .................................................. B60J 5/10
[52] U.S. Cl. ........................................ 296/146; 296/51; 296/164
[58] Field of Search .................. 296/164, 202, 50, 51, 296/56, 146; 49/55, 507

[56] References Cited

U.S. PATENT DOCUMENTS

| D. 229,554 | 12/1973 | Bell . | |
|---|---|---|---|
| D. 270,326 | 8/1983 | Sickler . | |
| 1,576,068 | 3/1926 | Reznik | 49/507 |
| 3,001,212 | 9/1961 | Towne . | |
| 3,496,689 | 2/1970 | Nerem | 296/164 X |
| 4,221,425 | 9/1980 | Welle et al. . | |
| 4,335,916 | 6/1982 | Gutgsell . | |
| 4,787,174 | 11/1988 | Brown | 49/55 |
| 4,799,730 | 1/1989 | Harasaki . | |
| 4,831,777 | 5/1989 | Johnson, Jr. | 49/55 |

FOREIGN PATENT DOCUMENTS 834014 2/1970 Canada .................. 296/164

Primary Examiner—Margaret A. Focarino
Assistant Examiner—Joseph D. Pape
Attorney, Agent, or Firm—Litman, McMahon & Brown

[57] ABSTRACT

A variable size door assembly for a vehicle rear opening includes a body with upper and lower portions and an inner door opening. The body is mounted on the vehicle by a hinge. The extensions can be cut off to reduce the body lower portion width whereby vehicles with rear openings of various widths can be accommodated by the door assembly. A pair of gasket subassemblies each includes a rigid gasket member with a side flange for mounting on a respective side jamb of the rear opening and a back flange extending into the rear opening from a respective side flange. Each gasket subassembly also includes a flexible gasket member mounted on a respective side edge at the body lower portion for resiliently and compressibly mating with a respective rigid gasket member. An inner door assembly is hingedly mounted on the body and includes a door for controlling ingress and egress through the inner door opening in the body.

2 Claims, 1 Drawing Sheet

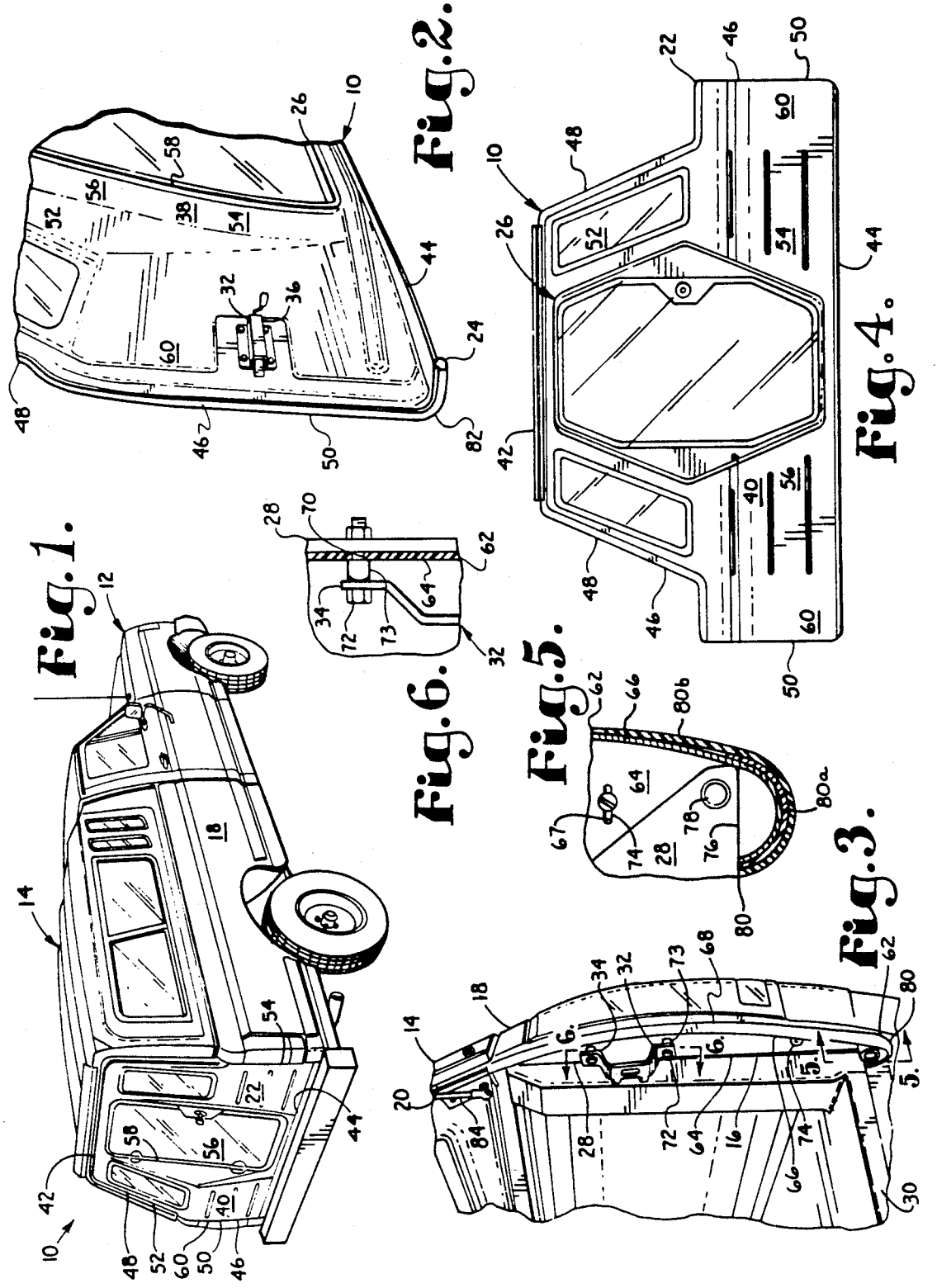

VARIABLE SIZE DOOR ASSEMBLY

BACKGROUND OF THE INVENTION

1. Field of the Invention

The present invention relates generally to ingress and egress structures, and in particular to a variable size door assembly for the rear openings in vehicles, such as pickup trucks including beds with covers mounted over them.

2. Description of the Related Art

Various doors, gates, hatches and similar mechanisms have heretofore been devised for providing ingress and egress to various structures. For example, many vehicles include compartments which are selectively accessible through such mechanisms.

One such type of vehicle is commonly referred to as a pickup truck, and normally includes a bed located behind a cab and provided with a rear tailgate opening which can be selectively closed by a tailgate assembly swingable between a lower, open position and an upper position substantially closing the tailgate opening.

Pickup trucks are commonly manufactured with beds having open tops, and covers can be provided for enclosing them. Such pickup truck bed covers, when installed, provide enclosed compartments which can be occupied by people and cargo. Access to such compartments can be provided through openings formed in the sides of the covers, which can be selectively covered by windows; through openings in the backs of the covers, which can be selectively covered by rear windows; and through tailgate openings, which can be selectively covered by the vehicle tailgate. A disadvantage with providing both a rear window and a tailgate on a pickup truck-and-cover combination is that both the rear window and the tailgate must be open to provide relatively unrestricted access to the rear compartment. Such unrestricted access may be preferred when relatively large loads are to be transported.

For convenience in accessing the full width bed and cover rear openings, it may therefore be preferable to provide a single door assembly which substantially covers both the tailgate and cover rear openings. However, such a single structure might be awkward and cumbersome to use due to its size. Therefore, an inner door assembly for ingress and egress by persons might be preferrable within the larger, overall door assembly.

Another possible problem with providing a single door assembly for pickup truck and shell combinations is that there are a number of different bed sizes with corresponding tailgate opening widths. Even among relatively small pickup trucks, both foreign and domestic, tailgate opening size differences are common. Although covers can sometimes be installed on beds with slight variations in width, it may be preferable to provide matching covers for relatively complete coverage over the tailgate bed openings for weather tightness and for aesthetics. Pickup truck owners may prefer that the covers they mount on their pickup truck beds aesthetically coordinate with and match the pickup trucks. Therefore, unsightly gaps and joints between the door and the tailgate opening edges may be visually undesirable. However, dealers providing pickup truck covers and rear door assemblies, which can be sold in combination, might incur significant expense in maintaining inventories of rear door assemblies individually sized to fit various makes and models of pickup trucks.

The present invention addresses some or all of these concerns with previous pickup truck cover and bed door assemblies, which concerns can also be present with vans and other vehicles.

SUMMARY OF THE INVENTION

In the practice of the present invention, a door assembly is provided for a vehicle rear opening and includes a body with an upper portion, a lower portion, an interior portion, an upper edge, a lower edge and a pair of opposite side edges. Each side edge includes an upper portion at said body upper portion for mating with a cover rear opening side edge and a lower portion at said body lower portion for mating with a tailgate opening side edge. A hinge mounts the body at its upper edge to an upper edge of the cover opening. A pair of gasket subassemblies are provided for providing a weather seal for each side edge lower portion and a respective tailgate opening jamb. Each gasket subassembly includes a rigid gasket member with a side flange mounted on a respective tailgate opening jamb and a back flange extending inwardly into the tailgate opening. A flexible gasket member is mounted on the side edge lower portions for resiliently and compressably mating with the rigid gasket members. The body lower portion includes a pair of side extensions at said side edge lower portions which can be cut off to decrease the width of the body lower portion for accommodating different vehicles with various tailgate opening widths. An inner door assembly is mounted on the body for controlling ingress and egress through an inner door opening in the body interior portion.

OBJECTS AND ADVANTAGES OF THE PREFERRED EMBODIMENTS

The principle objects and advantages of the present invention include providing a door assembly; providing such a door assembly for vehicles; providing such a door assembly for vehicle rear openings; providing such a door assembly for pickup truck cover rear openings and tailgate openings; providing such a door assembly which can selectively open and close substantially the entire areas of shell rear openings and tailgate openings; providing such a door assembly which includes an inner door assembly for selective ingress and egress by people; providing such a door assembly which can be adapted to accommodate various pickup trucks; providing such a door assembly which can be adapted to accommodate tailgate openings of various widths; providing such a door assembly which includes side extensions for cutting off to obtain a desired width; providing such a door assembly which includes an inner door assembly; providing such a door assembly with rigid gasket members for mounting on tailgate opening jambs; providing such a door assembly with rigid gasket members that can be sized and shaped for various pickup truck bed tailgate opening configurations; providing such a door assembly which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a rear, right side, perspective view of a door assembly embodying the present invention, shown mounted on a pickup truck with a cover.

FIG. 2 is an enlarged, fragmentary, rear perspective view of a door body thereof.

FIG. 3 is an enlarged, fragmentary, rear perspective view thereof, particularly showing a rigid gasket member shown mounted on a respective tailgate opening jamb.

FIG. 4 is a rear elevational view thereof.

FIG. 5 is an enlarged, fragmentary, cross-sectional view thereof, taken generally along line 5—5 in FIG. 3.

FIG. 6 is an enlarged, fragmentary, vertical, cross-sectional view thereof, taken generally along line 6—6 in FIG. 3.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of similar import.

Referring to the drawings in more detail, a vehicle rear opening door assembly embodying the present invention is generally designated by the reference numeral 10. Without limitation on the generality of useful applications of the door assembly 10, it is shown mounted on a pickup truck 12 with a cover 14 in selective, covering relation with respect to a tailgate opening 16 of a pickup truck bed 18 and a rear opening 20 of the cover 14. The door assembly 10 generally comprises a body 22, a pair of gasket subassemblies 24 and an inner door subassembly 26. The tailgate opening 16 is flanked by a pair of tailgate opening jambs 28 and includes a threshold 30.

II. Body 22

The body 22 includes a front or inner face 38, a back or outer face 40, an upper or head edge 42, a lower or threshold edge 44 and a pair of opposite side or jamb edges 46, each side edge 46 including upper and lower portions 48, 50 at upper and lower portions 52, 54 of the body 22. The body 22 includes an inner portion with an inner door opening 58. The body lower portion 54 is wider than the body upper portion 52 whereby a pair of opposite side extensions 60 are formed, each terminating at a respective side edge lower portion 50.

III. Gasket Subassemblies 24

Each gasket subassembly 24 includes a pair of rigid or fixed gasket members 62 (sometimes referred to as "gate fillers") each including a side or outer flange 64 mounted on a respective tailgate opening jamb 28 and a rear or inner flange 66 projecting inwardly from the side flange 64, whereby the flanges intersect at an outer, rear edge 68. The fixed gasket members 62 can be sized and shaped to conform to the jamb 28 configurations of the various pickup truck bed 13 configurations on which the door assembly 10 can be mounted.

The rigid gasket members 62 can include mounting holes 70 which correspond to the existing jamb structures of various vehicles, for example, the existing jamb posts, hinge brackets and other hardware can be matched with the configurations of the side flanges 64 whereby relatively little modification to the pickup truck bed jambs 28 is required. The rigid gasket member side flanges can be attached to the jambs with a latch bracket 34, mounting bolts 72 and spacers 73 for spacing the latch bracket 34 inwardly from the jambs 28. The rigid gasket member can be attached with additional suitable fasteners, such as sheet metal screws 74, and can have a notch 76 for a tailgate hinge tube 78.

The rigid gasket member rear flange 66 has a configuration generally conforming to the inner face 38 of the body 22 adjacent to the side edge lower portion 50. A weatherstrip 80 of flexible, material can be placed on the back face of the rear flange 66, and can comprise, for example, adhesive-backed foam tape. The weatherstrip 80 can be installed in double layers 80a, 80b for greater resiliency and compressability in forming a weather seal.

A flexible gasket member 82 extends around the door body edges 42, 44, 46 and can comprise a suitable resilient, compressable material for mating with the rigid gasket members 62 and with the cover rear opening 20. Adhesive-backed foam tape strips (not shown) can also be placed across the pickup truck bed threshold 30 for forming a seal with the body lower edge 44.

IV. Inner Door Subassembly 26

The inner door subassembly 26 includes a door 84 with upper, lower, and opposite side edges 86, 88 and 90. The door 84 is hingedly mounted on the body 22 at one of its side edges 90 by a hinge(s) 92 and is releasably attachable to the body 22 by a latch mechanism 94 at its other side edge 90 whereby the inner door 84 has a closed position substantially closing the body opening 58 and can be swung rearwardly to an open position extending rearwardly from the body 22. The door 34 can comprise a suitable material, such as clear plastic or glass.

V. Installation and Operation

The door assembly 10 is adapted to accommodate a variety of different cover 14 and pickup truck bed 18 combinations. In particular, a single door assembly 10 can include a body upper portion 52 shaped and sized to accommodate a particular size of cover rear opening 20, with the body lower portion 54 being width-adjustable to accommodate a number of different makes and models of pickup trucks 12 with different tailgate opening 16 widths and configurations. In this manner, the cover 14 can be sold with the door assembly 10 to provide a combination which will fit a variety of pickup trucks 12 and other vehicles. A dealer can thus stock one or more different styles of cover 14 and a relatively small number of different sizes of the door assemblies 10 for sale to a number of customers with different vehicles. In particular, relatively small pickup trucks 12, including both imported and domestic models, can be fit with door assemblies 10 by cutting the extensions 60 to appropriate sizes matching the tailgate opening 16 widths and configurations. The door assembly body 22 can be constructed of fiberglass or other suitable material, and the extensions 60 can be cut to provide desired widths and configurations for proper coverage of the tailgate openings 16. The flexible gasket members 82 can be placed on the door side edge lower portions 50 after the extensions 60 are cut, whereby any cut lines, burrs or roughness of the cut edge can be covered and concealed.

In operation, the gasket subassemblies 24 provide relatively weather tight sealing of the door assembly 10 on the cover 14 and the bed 16. Suitable adjustments can be made to maximize the weather seal protection, including repositioning the rigid gasket members 62. To this end the rigid gasket member side flanges 64 can include slots 67 for receiving the mounting bolts and screws 72, 74. In addition to providing a relatively weather tight seal, the gasket subassemblies 24 provide a finished appearance since resulting gaps between the tailgate opening 16 and the flexible gasket member 82 can be minimized, and also can be adjusted for relatively uniform, consistent widths. In some cases a good portion of the hardware on the bed 18 for mounting the original tailgate can be retained, and some may be reusable for mounting the rigid gasket members 62. If necessary, the shell and door assembly 10 combination can be removed and the original tailgate replaced.

The door assembly 10 can be provided with suitable props 84, which can comprise, for example, piston-and-cylinder units filled with pressurized gas. One end of each prop 84 can be attached to the body side edge 46 and the other end can be attached to either the cover 14 or the pickup truck bed 18 adjacent to their respective openings 20, 18.

It is to be understood that while certain forms of the present invention have been illustrated and described herein, it is not to be limited to the specific forms or arrangement of parts described and shown.

What is claimed and desired to be secured by Letters Patent is as follows:

1. In a door assembly with open and closed positions for a rear opening of a combination comprising a cover installed on any one of a variety of existing bed-type vehicles having various tailgate opening widths, each said vehicle having tailgate opening jambs and a threshold, the improvement comprising:
   (a) a pair of opposing side extensions disposed outwardly from said door assembly; said side extensions cuttable such that edges and width of said side extensions resulting from such cutting accommodate said tailgate opening width of a selected one of said vehicles; and
   (b) a pair of gasket subassemblies each including:
      (1) a rigid gasket member including:
         (i) a side flange connected to one of said tailgate jambs of said selected vehicle; said side flange having an outer edge;
         (ii) a rear flange connected to said side flange along said outer edge such that said rear flange projects generally inwardly from said side flange; said rear flange has a back face facing rearwardly; and
         (iii) said side flange being conformable to a respective one of said pair of tailgate opening jambs of said selected vehicle such that said rear flange conforms to said inner face of said door body adjacent to said rear flange as said door assembly is in said closed position; and
   (c) a flexible member mounted on one of said side extension cut edges for mating with a respective one of said rear flanges when said door assembly is in the closed position thereof.

2. A door assembly for a rear opening of a combination comprising an existing vehicle and an existing cover; said vehicle having a tailgate opening said tailgate opening having a width and being flanked by a pair of opposing tailgate opening jambs having a configuration characteristic to said vehicle and a threshold; said cover having a pair of opposing cover side edges; including:
   (a) a door body having an inner face and an outer face, said door body including:
      (1) a body upper portion having a pair of opposing upper portion edges and an upper edge such that each one of said pair of upper portion edges is positioned adjacent to a different one of said cover side edges as said door body is in a closed position and said upper edge is positioned adjacent to said cover; and
      (2) a body lower portion having a pair of opposing extensions and a lower edge such that said lower edge is positioned adjacent to said threshold as said door body is in said closed position; said pair of opposing extensions being cuttable such that said body lower portion has lower portion edges and width resulting from such cutting of said extensions; said lower portion edges each being positioned adjacent to a respective one of said pair of tailgate opening jambs as said door body is in said closed position said lower portion width accommodating said existing vehicle tailgate opening width in said closed position;
   (b) a first hinge connecting said upper edge to said cover such that said door body is pivoted about said upper edge;
   (c) a pair of gasket subassemblies, each including:
      (1) a rigid gasket member having:
         (i) a side flange tailgate jambs; said side flange having an outer edge;
         (ii) a rear flange connected to said side flange along said outer edge such that said rear flange projects generally inwardly from said side flange; said rear flange has a back face facing rearwardly;
         (iii) said side flange having at least one slot for adjustably mounting said side flange to a respective one of said pair of tailgate opening jambs such that said side flange conforms to the configuration thereof and such that said rear flange conforms to said inner face as said door body adjacent to said rear flange as said door body is in said closed position; and
         (iv) a weatherstrip comprising at least one layer of flexible material; said weatherstrip secured to said back face of said rear flange; and
      (2) a flexible gasket member connected to said inner face of said door body such that said flexible gasket member mates with said cover, said weatherstrip engaged to said rear flanges as said door body is in said closed position;
(d) a inner door opening in said upper portion and said lower portion; and
(e) an inner door subassembly including:
  (1) an inner door having opposing inner door side edges; said inner door dimensioned similarly to that of said inner door opening;
  (2) a second hinge mounting a first one of said inner door side edges to said door body; and
  (3) a latch mechanism mounted near a second one of said inner door side edges such that said inner door substantially closes said inner door opening when said inner door is releasably secured in said closed position.

* * * * *